United States Patent [19]

Kikuchi

[11] Patent Number: 5,323,268
[45] Date of Patent: Jun. 21, 1994

[54] COMPOUND LENS

[75] Inventor: Keisuke Kikuchi, Tsukuba, Japan

[73] Assignee: Agency of Industrial Science & Technology, Tokyo, Japan

[21] Appl. No.: 956,176

[22] Filed: Oct. 5, 1992

[30] Foreign Application Priority Data

Oct. 8, 1991 [JP] Japan .................................. 3-289346

[51] Int. Cl.$^5$ .............................................. G02B 3/00
[52] U.S. Cl. ..................................... 359/664; 359/653
[58] Field of Search ............... 359/664, 652, 653, 566, 359/618; 385/35

[56] References Cited

U.S. PATENT DOCUMENTS 4,208,088 6/1980 Hunzinger et al. ................. 359/664

FOREIGN PATENT DOCUMENTS 1-101502 4/1989 Japan .
3-84611 4/1991 Japan .
4-295817 10/1992 Japan .

OTHER PUBLICATIONS

Japanese Abstract, Japanese Patent Application Laying-open No. 295817/1992.
J. Opt. Soc. Am., vol. 67, No. 9, pp 1137–1143 Sep. 1977 Design of single element gradient-index collimator.
Academic Press, Inc., 1984, pp. 196—207-Fundamentals of Microoptics.
Applied Optics, vol. 25, No. 19, pp. 3356–3363, Oct. 1, 1986 Spherical gradient–index sphere lens.
Academic Press, 1978,-Gradient Index of Optics.

Primary Examiner—Scott J. Sugarman
Attorney, Agent, or Firm—Oliff & Berridge

[57] ABSTRACT

A spherical recess is provided to one end wall of a first planar lens and the opposite end walls of a second planar lens, the first planar lens having a thicknesswise index distribution in the vicinity of the one end wall whereas the second planar lens has a thicknesswise index distribution in the vicinity of each of the opposite end walls. A high refractive index homogeneous sphere lens is sandwiched between the first planar lens and the second planar lens to be brought into contact with the spherical recesses. A homogeneous semi-sphere lens is held to contact the other spherical recess of the second planar lens. The homogeneous sphere lens side first planar lens and second planar lens of the first planar lens and second planer lens increase in refractive index toward the homogeneous sphere lens so that the sphere lens is corrected in spherical aberration, and so that distribution gradient of the refractive index is selected for correcting the sphere lens in coma. The homogeneous semi-sphere lens side heterogeneous portion of the second planar lens decreases in refractive index toward the homogeneous semi-sphere lens to correct the whole curvature of field, and the refractive index of the homogeneous semi-sphere lens is selected to be low for correcting the distribution.

9 Claims, 12 Drawing Sheets

COMPOUND LENS

BACKGROUND OF THE INVENTION

1. Field of the Invention

The present invention relates to a compound lens which is preferably used in small cameras, demultiplexers, multiplexers and optical fiber couplers in fields of optical information processing and optical communication, and furthermore in the field of medical industry.

2. Description of the Prior Art

As compound lenses in such fields, compound lenses of configurations which will be described hereinafter have been known heretofore.

In U.S. Pat. No. 4,208,088, there is, as shown in FIG. 1, proposed a compound lens 11 having three arrays arranged, each array consisting of sphere lens 21 having a homogeneous refractive index. In FIG. 1, the character O designates an object point and the character I an image point. The pulse-like line shown below the compound lens 11 is a graph illustrating an index distribution of the compound lens 11, and it is shown that the sphere lens 21 are optically homogeneous. This compound lens 11 is very low in resolution since the sphere lens 21 homogeneous in refractive index are large in spherical aberration.

Another earlier attempts are illustrated in FIGS. 2 and 3. In FIG. 2, the compound lens 12 has a structure such that optically homogeneous sphere lenses are replace by sphere lenses 22 which are spherically symmetric in index distribution (heterogeneous in refractive index) for reducing spherical aberration. The compound lens 13 of FIG. 3 has such a configuration that sphere lenses 21 are held between distributed index or gradient index planar lens $23_1$, $23_2$, $23_3$ and $23_4$. In FIG. 3, reference numerals $23_1'$ to $23_6'$ designate refractive index heterogeneous portions of corresponding planar lenses $23_1$ to $23_4$. These attempts are disclosed in E. W. Marchand, Gradient Index Optics, pp.7-21, Academic Press; K. Iga, Y. Kokubun, and M. Oikawa, Fundamentals of Micoroptics, pp.196-207, Academic Press; Y. Koike, Y. Sumi, and Y. Ohtuska, Applied Optics, Vol.25, No.19, pp.3356-3363(1986); and Japanese Patent Application Laying-open No. 101502/1989, for example.

As shown in FIG. 2, in the lens 12 the image is curved concave toward the lens 22 (negative curvature of image surface). On the other hand, as shown in FIG. 3, the compound lens 13 has an image positively curved. In both the compound lenses 12 and 13, resolution is therefore deteriorated.

In view of this, in Japanese Patent Application No. 84611/1991 the inventors have proposed a compound lens 14 as shown in FIG. 4. In this compound lens 14, the index distribution of each of the refractive index heterogeneous portions $23_3'$ and $23_4'$ of the second layer planar lens $23_2$ of the compound lens 13 in FIG. 3 is made to have an opposite gradient, and thereby curvature of image plane is corrected for enhancing resolution.

To produce a erecting image this compound lens 14 includes three lenses 21, 21 and 21 homogeneous in refractive index and four planar lenses $23_1$ to $23_4$ having an axial index distribution. The compound lens 14 has drawbacks below. (i) the planar lenses have a large number (six) of spherical surfaces. (ii) the length of the lens is large as compared to the diameter of the sphere lenses. (iii) The three refractive index homogeneous sphere lenses 21, 21, and 21 are higher in refractive index than the planar lenses $23_1$ to $23_4$, and therefore each of the terms of an equation showing Petzval's theorem has positive sign, with the result that remained curvature of image field is still large although aberration can be corrected.

In Fourier transform lenses and camera lenses which have different purposes, images may be inverted, and the above disadvantages (i) and (ii) are therefore overcome to some extent. However, the entrance side and exit sides of these optical systems are asymmetrical, and therefore (iv) another problem of correcting distortion is produced.

In coupling lenses used for coupling optical fibers, the input and output sides of the optical systems are arranged symmetrically to each other, and therefore distortion is corrected. However, in the case where a large number of optical fibers are arranged in the input and output sides of these lenses, (v) it is still another problem to arrange optical fibers, which are away from the optical axis, in parallel with the latter. In conventional optical systems using a sphere lens, a drop in efficiency is produced unless the optical fibers are directed so that they are arranged at angular intervals about the center of the sphere lens.

To facilitate understanding of the present invention, improvement in curvature of image field which is stated in the compound lens 14 will be generally discussed. The general relational equations about tertiary aberration are $$MER.\ CURV. = -(3III+P) \qquad (2)$$

$$SAG.\ CURV. = -(III+P) \qquad (3)$$

In the equations, MER. CURV. represents a curvature of the tangential image surface, SAG. CURV. a curvature of sagital image surface, III a astigmatism coefficient, and P a Petzval sum.

Here, we study a sphere lens having a spherically symmetrical index distribution with a reduced spherical aberration. In this sphere lens, a light beam which is emitted from a point is focused on another point, and the astigmatism coefficient III is 0. By substituting III=0 to the equations (2) and (3), we have $$MER.\ CURV. = SAG.\ CURV. = -P \qquad (4)$$

In the case of $P \neq 0$, the best curvature of field of sphere lenses becomes a half of the absolute value of the curvature of field of a spherically symmetric sphere lens since the equation (5) is obtained from equations (2) and (3) if the astigmatism coefficient $III = -P/2$ by some means.

$$MER.\ CURV. = -SAG.\ CURV. = P/2 \qquad (5)$$

That is, the resolution substantially becomes double.

In such a manner, the curvatures of the tangential image surface and the curvature of sagital image surface may be balanced. However, in the conventional compound lenses except the compound lens 14 it is not possible to control astigmatism coefficient III with ease. Accordingly, it is an object of the present invention to establish controlling of astigmatism coefficient in lenses which are different in purpose and configuration from the compound lens 14.

Next, a problem of the present invention about distortion will be described in detail. In a camera lens, distortion becomes 0% if an image of a grating pattern object is formed similarly. In other words, if a height of an image at an image point of an incident light beam of which principal ray forms an angle of $\omega$ with the optical axis of the lens is in proportion with $\tan\omega$, distortion becomes zero.

When in a Fourier transform lens, parallel rays of a wavelength $\lambda$ are incident on a diffraction grating having an grating pitch and located at a focus on the object side, a direction of m-th diffraction is given by the equation (6).

The spatial frequency is in proportion with $1/d$, and therefore the distortion is eliminated if the height of an image is proportionate to $\sin\omega$.

In $f\omega$ lens (usually called $f\theta$), the height of an image may be in proportion with $\omega$.

As described above, distortion of compound lenses has different definitions according to objects of use.

Another object of the present invention is to provide a compound lens which has the same construction with the same index distribution for various uses, and which is capable of correcting distortion of the lens for various uses by modifying a small part of parameters thereof.

SUMMARY OF THE INVENTION

A first aspect of the present invention is directed to a compound lens having a focus, comprising:

a first and second planar lenses having coaxial optical axis and each having a homogeneous portion, the first planar lens having one end wall including spherical recess therein whereas the second planar lens has first and second opposite end walls, each opposite end wall including spherical recess therein, the one end wall of the first planar lens and the first end wall of the second planar lens oppositely facing;

a sphere lens held between oppositely facing end walls of the planar lenses to contact the spherical recesses of the oppositely facing end walls; and a semi-sphere lens held on the second end wall of the second planar lens to fit into the spherical recess of the second end wall, wherein:

the first planar lens has an index distribution along the optical axis at least in the vicinity of the one end wall thereof to thereby form a heterogeneous portion;

the second planer lens has an index distribution along the optical axis at least in the vicinity of each of the opposite end walls thereof to thereby form a heterogeneous portion;

the center of curvature of the semi-sphere lens is placed in the vicinity of the focus on the optical axis;

each of the sphere lens, the homogeneous portions of the planar lenses, and the semi-sphere lens is formed so that the refractive index thereof decreases in the described order;

the heterogeneous portion of the first planar lens and the heterogeneous portion of the first end wall of the second planar lens increase in refractive index toward the sphere lens so that the sphere lens is corrected in spherical aberration, and the heterogeneous portion of the first planar lens and the heterogeneous portion of th& first end wall of the second planar lens are formed so that distribution gradient of the refractive index thereof are selected for correcting the sphere lens in coma;

the heterogeneous portion of the second end wall of the second planar lens decreases in refractive index toward the semi-sphere lens for correcting the compound lens in curvature of field;

the semi-sphere lens is smaller in refractive index than the heterogeneous portion of each of the planar lenses for correcting the lens in distortion.

The compound lens may be used as a Fourier transform lens, in which the refractive index of the semi-sphere lens is selected in a range smaller than the refractive index of each of the first and second planar lenses, and when parallel incident rays are irradiated at an angle of $\omega$ with the optical axis to form an image, the image is in proportion in height with $\sin\omega$.

The compound lens may be used as a $f\omega$ lens, in which the refractive index of the sphere lens is selected in a range smaller than the refractive index of the first and second planar lenses, and when parallel incident rays are irradiated at an angle of with the optical axis to form an image, the image is in proportion in height with $\omega$.

Furthermore, the compound lens of the first aspect may be used as a camera lens, in which a ratio between the dispersion coefficients ($\delta N_b/\delta\nu$) of the homogeneous portions of the planar lenses and the dispersion coefficients ($\delta N_s/\delta\nu$) of the sphere lens is selected in the neighborhood of an equation (1) below; dispersion $\delta\sigma/\delta\nu$ of distribution coefficients $\sigma$ of the heterogeneous portion of the planar lenses may be selected small, and when parallel incident rays are irradiated at an angle of $\omega$ with the optical axis to form an image, the image is in proportion in height with $\tan\omega$.

$$(\delta N_s)/N_s=(\delta N_b)/N_b \tag{1}$$

where $N_b$ indicates a refractive index of the homogeneous portion of the planar lenses, $N_s$ is a refractive index of the sphere lens, and $\nu$ is a frequency of light.

According to the second aspect of the present invention, there is provided a compound lens having a focus, comprising:

a first pair of first and second planar lenses having coaxial optical axis and each having a homogeneous portion, the first planar lens having first and second opposite end walls, and the second planar lens has first and second opposite end walls, each opposite end wall of the first planar lens and the second planar lens including spherical recess therein, the second opposite end wall of the first planar lens and the first opposite end wall of the second planar lens being oppositely facing;

a sphere lens held between oppositely facing end walls of the planar lenses to contact the spherical recesses of the oppositely facing end walls;

a first semi-sphere lens held on the first end wall of the first planar lens to fit into the spherical recess of the first end wall thereof; and a second semi-sphere lens held on the second end wall of the second planar lens to fit into the spherical recess of the second end wall thereof, wherein;

the first planar lens and the second planar lens have each an index distribution along the optical axis at least in the vicinity of each of the first and second opposite end walls thereof to thereby form a heterogeneous portion;

the center of curvature of the each of the first and second semi-sphere lenses is placed at one of conjugate points, the conjugate points being in the relationship of an object point and an image point to each other;

the heterogeneous portion of the second end wall of the first planar lens and the heterogeneous portion of the first end wall of the second planar lens increase in refractive index toward the sphere lens so that the sphere lens is corrected in spherical aberration;

each of the sphere lens, the semi-sphere lenses, and the homogeneous portions of the planar lenses is formed so as to decrease the refractive index thereof in the described order so that a principal ray between an object point, away from the optical axis, and the inverted image thereof becomes substantially parallel with the optical axis, whereby the compound lens may be used for interconnecting optical fibers.

The compound lens of the second aspect of the present invention may be used for dividing, joining, demultiplexing or multiplexing light beams of optical fibers, in which the sphere lens may comprise sphere lens halves and one element attached between the sphere lens halves, the one element is one of a reflecting mirror, a half mirror, a multilayer filter, and a diffraction grating; and the optical axis of the first and second planar lenses have same direction or perpendicularly intersect at the sphere lens.

Preferably, a compound lens unit uses two compound lenses according to the second aspect of the present invention. In the compound lens unit, the compound lenses may be connected in seres with corresponding semi-sphere lenses oppositely facing to each other; the sphere lens of each compound lens may comprise: sphere lens halves, each of the sphere lens half having a planar wall oppositely facing to a planar wall of the other sphere lens half; and a multilayer filter attached on the oppositely facing planar walls of the sphere lens halves, and wherein: the oppositely facing semi-sphere lenses may be jointed with a shift of the radius thereof to form an exposed planar wall portion for injecting wavelength division multiplex light into the compound lens unit, whereby the injected wavelength division multiplex light is reflected or allowed to pass the muti-layer filter in the sphere lenses, and reflected components are slantingly reflected toward an adjacent semi-sphere lens whereas passed components are sent to another semi-sphere lens for taking out through a glass fiber.

Moreover, a compound lens unit may use two compound lens composites each including parallel compound lenses according to the second aspect of the present invention. In the compound lens unit, the compound lens composites may be connected in series with corresponding semi-sphere lenses oppositely facing to each other; the sphere lens of each compound lens may comprise: sphere lens halves, each of the sphere lens half having a planar wall oppositely facing to a planar wall of the other sphere lens half; and a multilayer filter attached on the oppositely facing planar walls of the sphere lens halves, and wherein: the oppositely facing semi-sphere lenses may be joined with a shift of the radius thereof to form an exposed planar wall portion for injecting wavelength division multiplex light into the compound lens unit, whereby the injected wavelength division multiplex light is reflected or allowed to pass the multilayer filter in the sphere lenses, and reflected components are slantingly reflected toward an adjacent semi-sphere lens whereas passed components are sent another semi-sphere lens for taking out through a glass fiber.

A third aspect of the present invention is directed to a compound lens comprising: a planar lens including opposite end and an optical axis and having an index distribution along the optical axis in the vicinity of one end thereof, the planar lens having spherical recess at a corresponding position of each end; and a pair of semi-sphere lenses each having a planar wall and being homogeneous in refractive index, and each semi-sphere lens being fitted into the spherical recess, one of the semi-sphere lenses having one of a reflecting mirror and a reflective diffraction grating formed on the planar wall thereof.

In the compound lenses of configurations previously described, spherical aberration and sine condition are corrected as follows: The spherical aberration of the sphere lenses is produced because marginal rays focus at a position before a position at which paraxial rays focuses. In the compound lens of the present invention, the first and second planar lenses which hold the sphere lens homogeneous in refractive index increase in refractive index from the inside toward end walls, and therefore in each planar lens the peripheral of each spherical recess is higher in refractive index than the center portion thereof. The difference in refractive index between the spherical recess of each planar lens and the spherical lens which is in contact with these spherical recesses is small in the peripheral portion as compared to the center of each of the spherical recesses. Thus, the refraction of peripheral rays is reduced and spherical aberration is corrected. The sine condition which is a necessary condition to produce an image without coma aberration is satisfied with distribution of refractive index gradients of the first and second planar lenses.

In the compound lens of the present invention, correction of curvature of field is achieved as follows: As shown in FIGS. 1 and 2, in the sphere lens a curvature of field is negative, that is, concave toward the lens through which the light has passed. In the compound lens of FIG. 3, there is a tendency that the curvature of field becomes positive with an index distribution to correct the spherical aberration. This can be explained using an equation which expands the cosine formula to a heterogeneous system. For example, a cosine formula of a meridian will be formularized. When two close rays are, as shown in FIG. 5, incident at points P and Q on a spherical plane, let $PT = t$, $PT' = t'$, then, the relation between t and t' is given by the equation (7) using Snell's refraction formula $$N' \cos^2 i'/t' = N \cos^2 i/t + (N' \cos i' - N \cos i)/r - (\delta N_{PQ}/PQ)(\sin i + \tan u \cdot \cos i) \quad (7)$$

We consider the incident side to the sphere lens in equation (7). Since the refractive index of each of the heterogeneous portions of the planar lenses increases toward the sphere lens, and the difference between $N'(=N_s)$ and $N=N(y)$ becomes small to two close rays which pass the periphery of the spherical plane, so that the power of the second term of the right side decreases. In addition, the added differential term $-(\sigma N_{PQ}/PQ)(\sin i + \tan u \cdot \cos i)$ becomes negative at the tangential image point. Thus, it is considered that the right side decreases, and that t', that is, the distance from the spherical surface to the intersection of the two close light beams increases. As described, the distribution to correct spherical aberration has a tendency to make the curvature of a tangential image surface excessively positive, and therefore it is necessary to partly reduce the positive curvature. Thus, the index distribution of the semi-sphere side of the second planar lens is set so as to reduce from the inside toward the semi-sphere side. If this distribution is used on the side of the sphere lens, the direction of the reduction of refractive index is a direction to increase spherical aberration, but the actual spherical aberration is small since a convergent light beam toward the flat plane of the homogeneous refractive index semi-sphere lens forms an image in the vicinity of the same plane.

In short, an index distribution to correct spherical aberration makes curvature of field excessively positive, and this overcome by providing a reverse distribution to a portion which is small influence to spherical aberration.

Correction of distortion in the compound lens of the configuration previously described is achieved as follows: When the refractive index of the homogeneous semi-sphere lens 2 is changed from a low value to a higher value in a range below the refractive index of the planar lens $3_1$, as shown in FIGS. 6 and 7, the distortion of the grating pattern (image) varies form a pincushion shape to a barrel shape. When the refractive index of the semi-sphere lens 2 is low, the semi-sphere lens which is embedded in a planar lens $3_1$ becomes a powerful concave lens, and therefore rays toward high image heights refract strongly outwardly. Thus, as shown in FIG. 6, the image forms a pincushion shape. On the contrary, when the refractive index of the homogeneous semi-sphere lens 2 is high, the semi-sphere lens becomes a weak concave lens, and therefore rays toward high image heights refract less strongly outwardly. Thus, as shown in FIG. 7, there is a tendency that the image forms a barrel shape. In FIG. 7, the reference numeral $3_1$ is a planar lens having an index gradient, and $3_1'$ is a heterogeneous portion of the planar lens $3_1$. FIG. 8 illustrates a calculated result of distortion to the refractive index of a homogeneous semi-sphere lens 2 in each of a camera lens, an fθ lens and a Fourier transform lens, the result having been obtained by ray tracing. The homogeneous sphere lens 20 is minimum in distortion at a refractive index ratio with the planar lens $3_1$, 0.9, 0.93 and 0.96. The selected refractive indexes are lower than that of each planar lens, and this means that concave lenses are placed. The Petzval sum becomes small, and thus curvature of field is further improved. This is because the Petzval sum P of the equation (5) becomes $P_j<0$ on the semi-spherical surface from the equation (8) which defines the Petzval sum P while part of the other terms $(P_j>0)$ are cancelled.

$$P = pj$$

$$Pj = \{(Nj' - Nj)/rj\}/(Nj'Nj) \quad (8)$$

According to the compound lens of the present invention coupling between optical fibers which are parallel with and away from the optical axis is made as follows: As shown in FIG. 12, which will be described hereinafter, each of the first planar lens $3_1$ and second planar lens $3_2$ is provided in opposite end walls thereof with spherical recesses 4, respectively. The homogeneous sphere lens 1 is held between planar lenses $3_1$ and $3_2$. A homogeneous semi-sphere lens is fitted into each of spherical recesses, which is formed in the opposite end walls of each planar lenses, and the centers of the semi-sphere lenses form conjugate points to each other. To correct spherical aberration and curvature of field, the refractive index of the heterogeneous portions $3_0'$, $3_1'$, $3_2'$ and $3_3'$ of the planar lenses $3_1$ and $3_2$ increases toward the homogeneous sphere lens 1 and decreases toward the corresponding homogeneous semi-sphere lenses 2. Since the compound lens of the present invention is a 1:1 optical system, the distortion of the compound lens is automatically corrected if curvature of field is corrected. Moreover, to arrange even optical fibers which are away from the optical axis in parallel with and in the vicinity of the optical axis, each of the homogeneous sphere lens 1, the homogeneous semi-sphere lenses 2, and homogeneous portions of the planar lenses $3_1$ and $3_2$ is formed so that the refractive index thereof decreases in the described order. More specifically, the homogeneous sphere lens 1 is higher in refractive index than the homogeneous portions of the planar lenses $3_1$ and $3_2$, and is thus a convex lens. The reason why the homogeneous semi-sphere lenses 2 are lower in refractive index than the homogeneous sphere lens 1 is for the purpose to prevent refraction of light from becoming excessively strong since the heterogeneous portions $3_0'$, $3_1'$, $3_2'$ and $3_3'$ of the planar lenses $3_1$ and $3_2$ decrease in refractive index toward the corresponding semi-sphere lens 2.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiment 1

Figure 9:
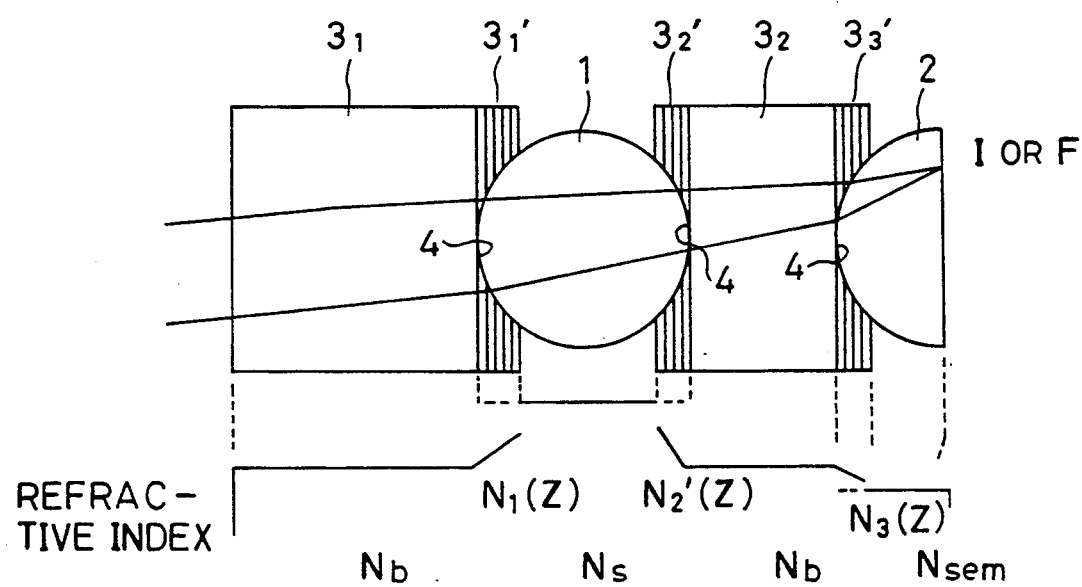
FIG. 9 is a diagram illustrating a basic configuration and an index distribution of one embodiment of a compound lens of the present invention.

FIG. 9 illustrates an axial cross-section and the index distribution of an important portion of a first embodiment of a compound lens of the present invention. In FIG. 9, the reference numeral 1 designates a homogeneous sphere lens, 2 is a homogeneous semi-sphere lens, $3_1$ and $3_2$ are first and second planar lenses each having an index distribution, $3_1'$ $3_2'$ and $3_3'$ are heterogeneous portions of the planar lenses, and $4_1'$ $4_2'$ and $4_3'$ are spherical recesses. The reference character I indicates an image point and F is a Fourier transform plane. The equation (9) is obtained, representing index distributions of the heterogeneous portions $3_1'$ $3_2'$ and $3_3'$ of the planar lenses by adding subscriptions j=1,2 and 3 in the described order.

$$N_j(')=N_0(')\{1+\epsilon_{fj}\Delta z_j/R+\epsilon_{sj}(\Delta z_j/R)^2\}^{\frac{1}{2}} (j=1,2,3) \quad (9)$$

where $\Delta z_1$, $\Delta z_2$, $\Delta z_3$ are coordinates in the optical axis when the sphere side (j=1,2) and semi-sphere side (j=3) is made positive with intersections of the optical axis with the spherical surfaces of the first, the second, and the third spherical recesses $4_1$, $4_2$ and $4_3$ being taken as reference points; (') is put to a refractive index on the right side of each interface but can be omitted since each interface spherical surface corresponds to a heterogeneous portion. The equation of the spherical surface is expanded by a height $y_j$ from the optical axis to obtain the following equation (10):

$$\begin{aligned}\Delta z_j/R &= 1 - \sqrt{1-(y_j/R)^2} \\ &= (y_j/R)^2/2 + (y_j/R)^4/8 \\ &\quad (j=1,2,3)\end{aligned} \quad (10)$$

By substituting this equation (10) into the equation (9), the refractive indexes on the spherical surfaces at an incident height $Y_1$ and an outputting height $Y_2$ are given by the equation (11).

$$N_j(y_j)(')=N_0(')\{1+\sigma_{fj}(y_j/R)^2+\sigma_{sj}(y_j/R)^4\}, \quad (11)$$

Then, the relations between the coefficients are given by the equation (12).

$$\sigma_{fj}=\epsilon_{fj}/4, \quad \sigma_{sj}=\epsilon_{fj}16+(\epsilon_{sj}-\epsilon_{fj}^2/4)8 \quad (j=1,2,3) \quad (12)$$

The lower terms of distribution factors which correct spherical aberration and the sine condition are given by the equation (13).

The equation (13) is obtained in accordance with the following principle.

In the sphere lens without the heterogeneous portion, the lens formula according to the light in the vicinity of the axis is the following.

$$\frac{1}{L_{20}'}=\frac{1}{f}+\frac{1}{L_{10}} \quad (i)$$

The lens formula according to the peripheral light is the following.

$$\frac{1}{L_2'}=\frac{1}{f}+\frac{1}{L_1}+S_A\left(\frac{h_1}{R}\right)^2 \quad (ii)$$

Here, in the aberration term of this equation, $h_1$ is the perpendicular drawn from the sphere center to the extension of the incident light.

The equation (iii) below for reconciling the equation (i) with the equation (ii) is derived by decreasing the refraction of the peripheral with the effort of the index distribution in the axis direction.

$$\sigma_{f1}Q_1^4+\sigma_{f2}Q_2^4=Sa \quad (iii)$$

On the other hand, in order to satisfy the sine condition, variations in refractive index in the light direction in accordance with the heterogeneous portion on the first sphere surface and the second sphere surface are equalized.

$$\sigma_{f1}Q_1^3=\sigma_{f2}Q_2^3 \quad (iv)$$

The simultaneous equations of (iii) and (iv) are solved to obtain the equation (13)

$$\sigma_{f1}=Sa/\{Q_1^3(Q_1+Q_2)\},$$

$$\sigma_{f2}=Sa/\{Q_2^3(Q_1+Q_2)\} \quad (13)$$

Here, $$S_A = (1 - 1/n_{sb}) \{3/n_{sb} - 1 - 1/n_{sb}^2 - R^2/(L_1 L_2')\} \quad (14)$$

Figure 10:
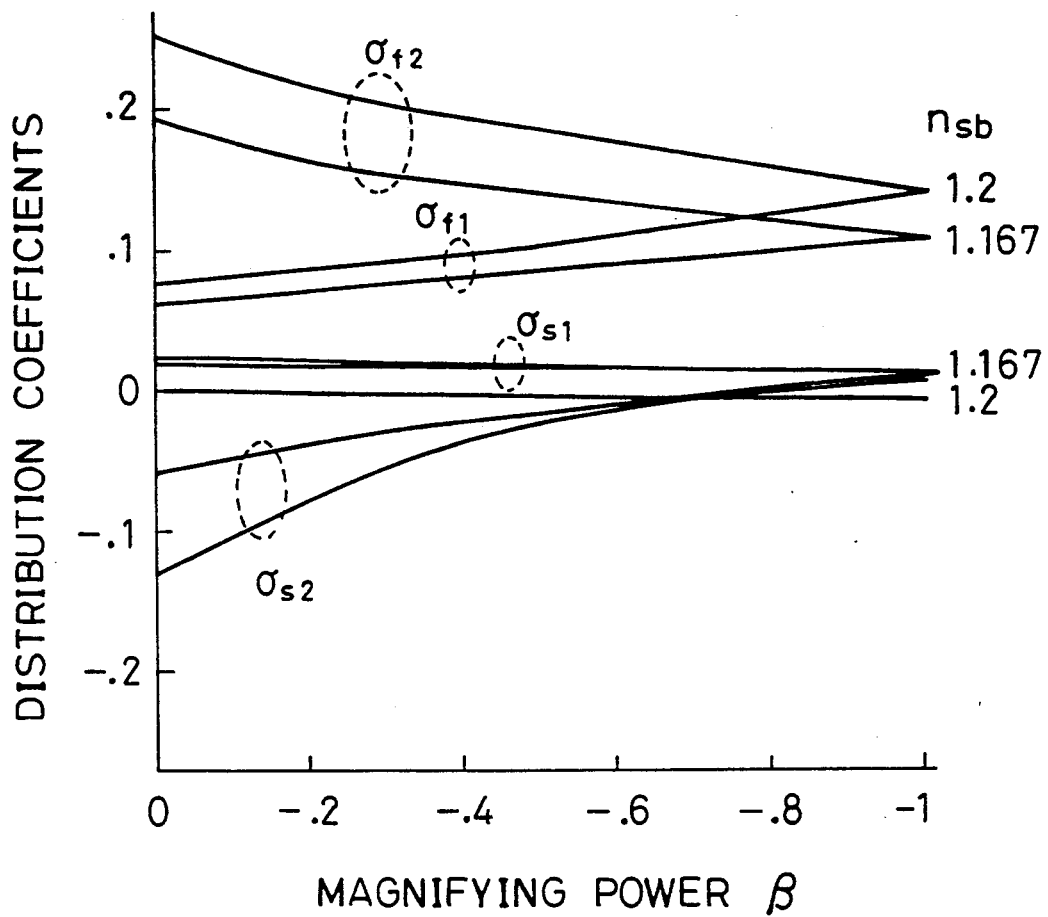
FIG. 10 is a graph for determining distribution coefficients of the sphere lens side heterogeneous portion of the planar lens for correcting spherical aberration and sine condition.

Here, $n_{sb} = N_s/N_b, \; N_1' = N_s, \; N_{01} = N_{02}' = N_b,$ $$Q_1 = 1 + R/L_1, \; Q_2 = 1 - R/L_2' \quad (15)$$

where $L_1$ is a distance from the center of the sphere to the object point, and $L_2'$ a distance from the center of the sphere to the image point (the sign is plus on the left side of the center of the sphere whereas minus on the right side). The higher coefficients sj (j=1,2) are determined by ray tracing according to trial and error method, and are shown in FIG. 10 together with the lower coefficients previously mentioned. In FIG. 10, the distribution factors $\sigma$ fj and $\sigma$ sj (j=1,2) are shown to a multiplying factor $\beta$ using the refractive index ratio $N_{nb} = N_s/N_b$ of the homogeneous sphere 1 and the homogeneous portions $3_1$, $3_2$ as a parameter. In the third heterogeneous portion $3_3'$, the curvature of field becomes small and the condition of the equation (5) is satisfied when the lower term have such values as given by the equation (16) below with the higher term $\sigma_{s3} = 0$.

$$\sigma_{f3} \sim -\frac{Q_1^2 \sigma_{f1} + Q_2^2 \sigma_{f2}}{Q_1^2 + Q_2^2} \quad (16)$$

Fourier Transform Lens

Figure 11:
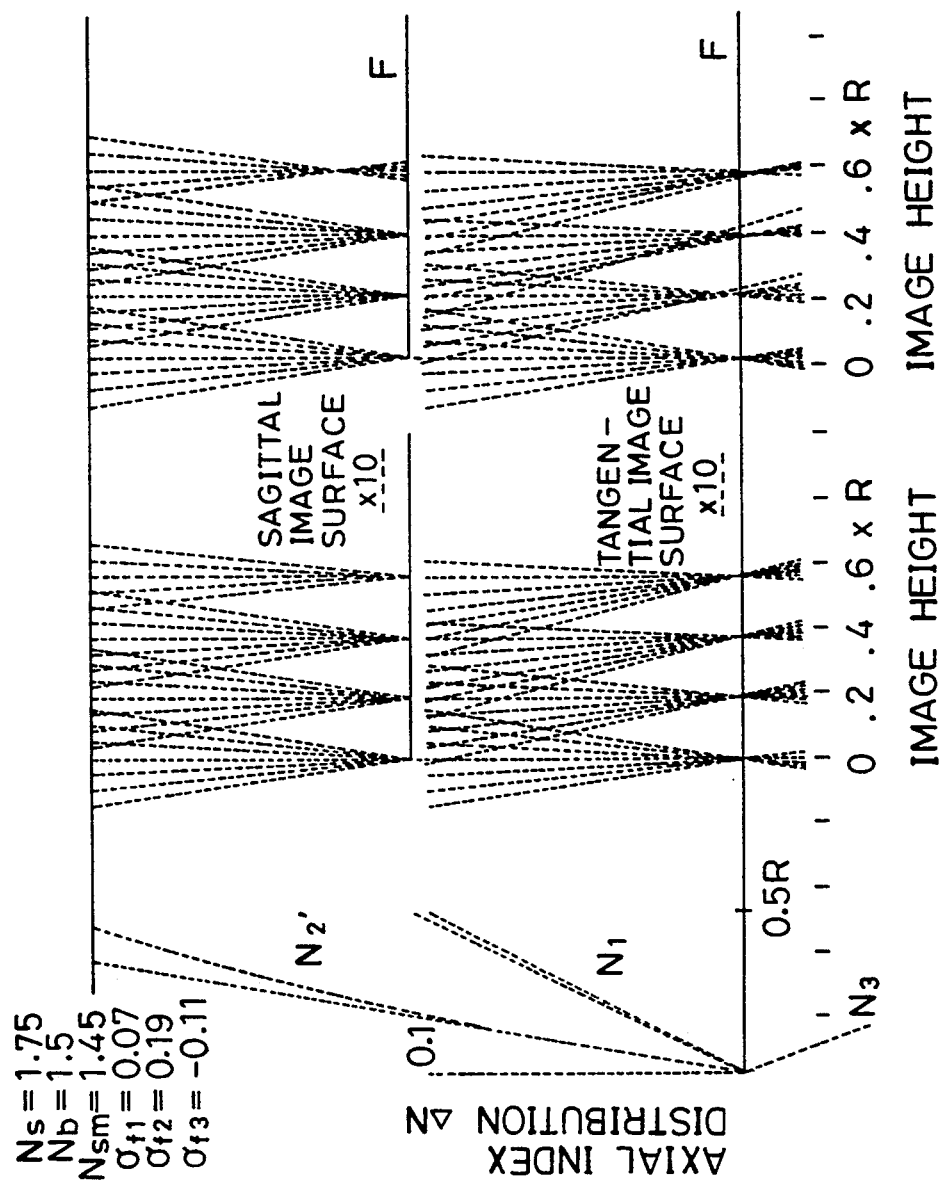
FIG. 11 is a diagram illustrating bundles of rays in the vicinity of an image forming plane of incident parallel light from an object side focal plane in a direction in which the spatial frequency 1/d of the equation (5) becomes equal intervals when: in the lens in FIG. 9, the distribution of the sphere lens side heterogeneous portions thereof are determined by the graph of FIG. 10; and the semi-sphere lens side heterogeneous portion has a distribution reverse to the distribution of the sphere lens side heterogeneous portions.

FIG. 11 is a ray diagram in the vicinity of an image plane in which the present invention is applied to a Fourier transform lens. FIG. 11 illustrates light beams in the vicinity of the image side focal plane when a geometrical optics diffraction grating is placed on the object side focal plane, and parallel rays are irradiated in every direction in which the angle $\omega$ which forms with the optical axis places spatial frequency 1/d, satisfying the equation (6), at regular intervals. Supposing $n_{sb} = N_s/N_b = 1.167$ and multiplying factor $\beta = 0$, the distribution factors of the first and the second heterogeneous portions which correct spherical aberration and the sine condition are determined from FIG. 10.

As a result, $\sigma_{f1} = 0.07$, $\sigma_{f2} = 0.19$, $\sigma_{s1} = +0.02$, $\sigma_{s2} = -0.065$. In these items, the lower items $\sigma_{f1} = 0.07$, $\sigma_{f2} = 0.19$ are used, the higher items $\sigma_{s1} = +0.02$, $\sigma_{s2} = -0.065$ are not used. New items $\sigma_{s1} = 0.012$, $\sigma_{s2} = -0.015$ that are determined according to trial and error method are used instead of the above higher items. The index distribution of the third heterogeneous portion is determined to correct curvature of field according to trial and error method, and $\sigma_{f3} = -0.11$ and $\sigma_{s3} = 0$. To reduce distortion the refractive index of the homogeneous semi-sphere lens 2 is selected so that $N_{sem}/N_b = 0.96$. The center of the curvature of the homogeneous semi-sphere lens 2 is placed at the focus, that is, is placed at a distance of the medium focal length f indicated in equation (17) away from the center of the sphere lens.

$$f = 0.5 \, R n_{sb}/(n_{sb} - 1) \quad (17)$$

The upper and lower portions of FIG. 11 illustrate the curvature of sagital image surface and the tangential image surface, and the right view of each of the upper and lower portions has a magnification of 10 with the image points are drawn closer to each other. From FIG. 11, it is understood that about 200/R of resolution can be expected at an image height of 0.6 R. The distortion is within 1%.

Camera Lens

Figure 1:
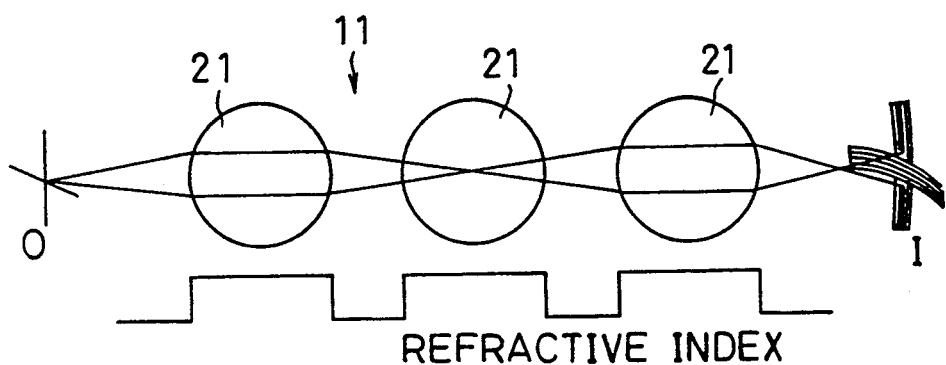
FIG. 1 is a diagram illustrating a configuration, an index distribution and an image plane of one example of the conventional three sphere lens optical system.
Figure 2:
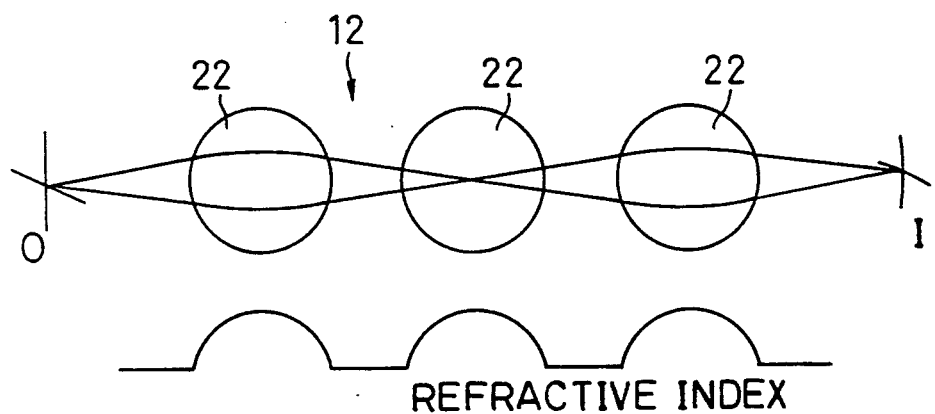
FIG. 2 is a diagram illustrating a configuration, an index distribution and an image plane of another example of the conventional three sphere lens optical system.
Figure 3:
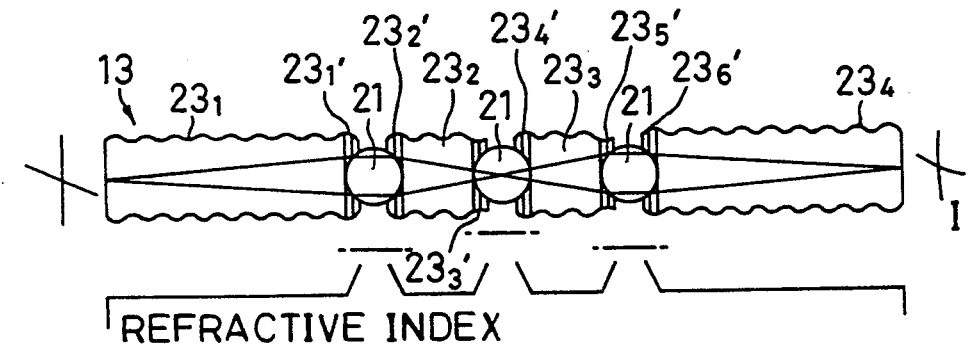
FIG. 3 is a diagram illustrating a configuration, an index distribution and an image plane of still another example of the conventional three sphere lens optical system.
Figure 4:
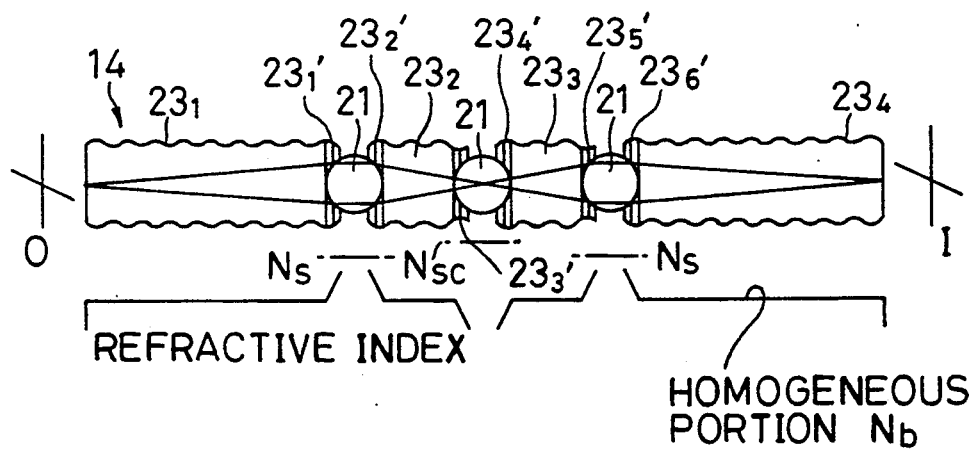
FIG. 4 is a diagram illustrating a configuration, an index distribution an image plane of another example of the conventional three sphere lens optical system.
Figure 5:
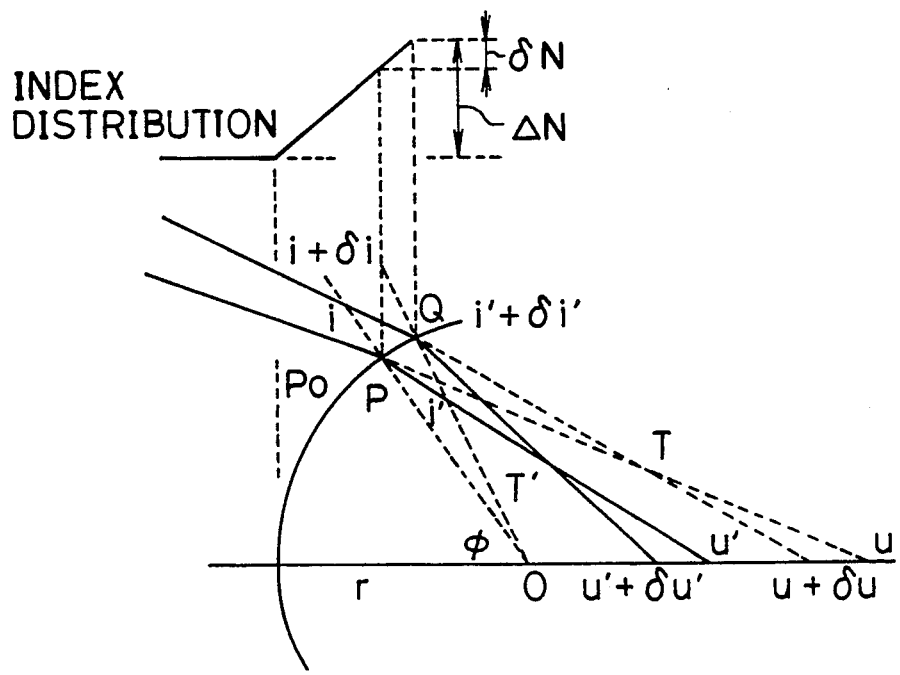
FIG. 5 is a diagram illustrating refraction optical path for extending a cosine formula to a conventional optical system having an index distribution.
Figure 8:
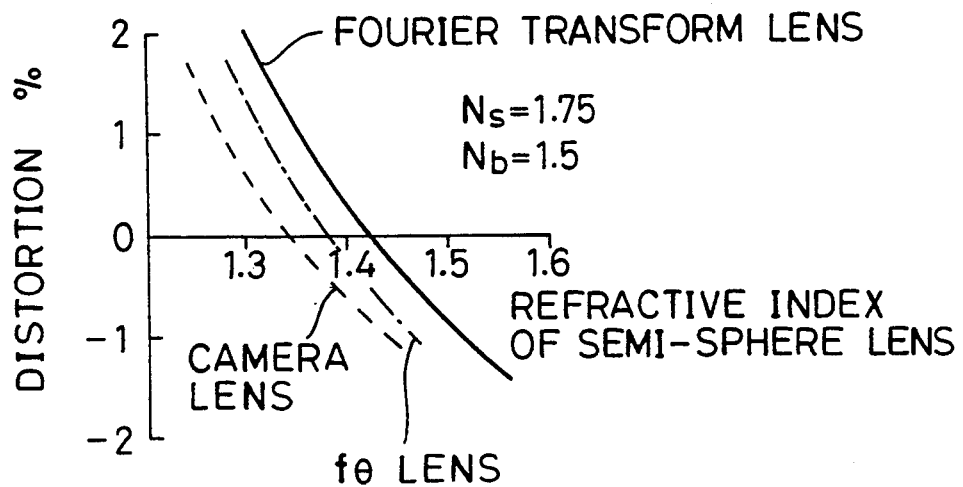
FIG. 8 is a graph illustrating relationship between a refractive index and a distortion of a semi-sphere lens in a Fourier transform lens, and an fθ lens.
Figure 6:
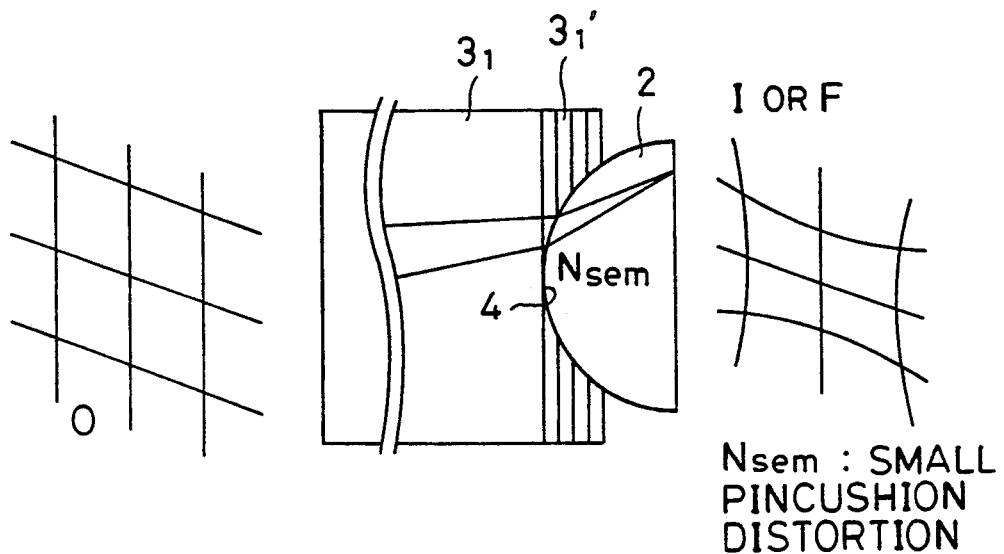
FIG. 6 is a diagram illustrating a configuration of one example of a conventional optical system, showing a relationship between a refractive index and a distortion of a semi-sphere lens.
Figure 7:
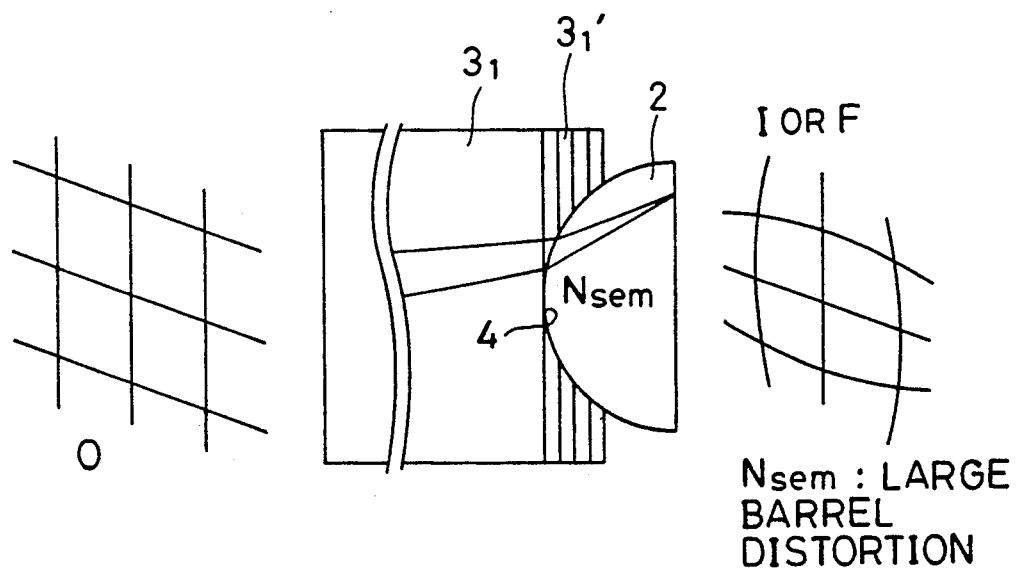
FIG. 7 is a diagram illustrating a configuration of another example of a conventional optical system, showing a relationship between a refractive index and a distortion of a semi-sphere lens; a camera lens.

When the present invention is applied to a camera lens, the ray diagram in the vicinity of the image plane is similar to the Fourier transform lens of FIG. 8, and therefore illustration of the camera lens is omitted. While the Fourier transform lens provides f sin$\omega$ at equal intervals, the camera lens gives f tan$\omega$ with equal intervals at the image plane. Thus, the refractive index of the semi-sphere lens of the camera lens is selected to a different value $N_{sem}/N_b = 1.35/1.5 = 0.9$. Supposing the close-up distance is 350R (70 cm when R=2 mm), then the magnifying power $\beta$ varies from 0 to $-0.01$, but the index distribution to correct spherical aberration and sine condition is constant within this range from FIG. 10. Even if the flat plane is an image plane at $\beta = 0$, the aberration does not increase at $\beta = -0.01$ since the position of the image plane varies although an air gap is produced. Therefore, the first and the second heterogeneous portions have the same index distribution as the Fourier transform lens, and the index distribution of the third heterogeneous portion is a different value $\sigma_{f3} = -0.1$ and $\sigma_{s3} = 0$.

In the case where the present invention is applied to a fiber bundle head, the magnifying power $\beta$ is set to the ratio between the bundle diameter and the diameter of an object, and the index distribution is determined from FIG. 10. The resulting value of the distribution must be provided to the first and second planar lenses $3_1$ and $3_2$.

f$\theta$ Lens

In the case where scanning is conducted by a polygonal mirror using a light beam and an image is formed with a lens, the lens is required which makes a height of the image to proportionate to a scanning angle. The refractive index of the homogeneous semi-sphere lenses 2 is selected $N_{sem}/N_b = 0.93$ from FIG. 8.

Embodiment 2

Figure 12:
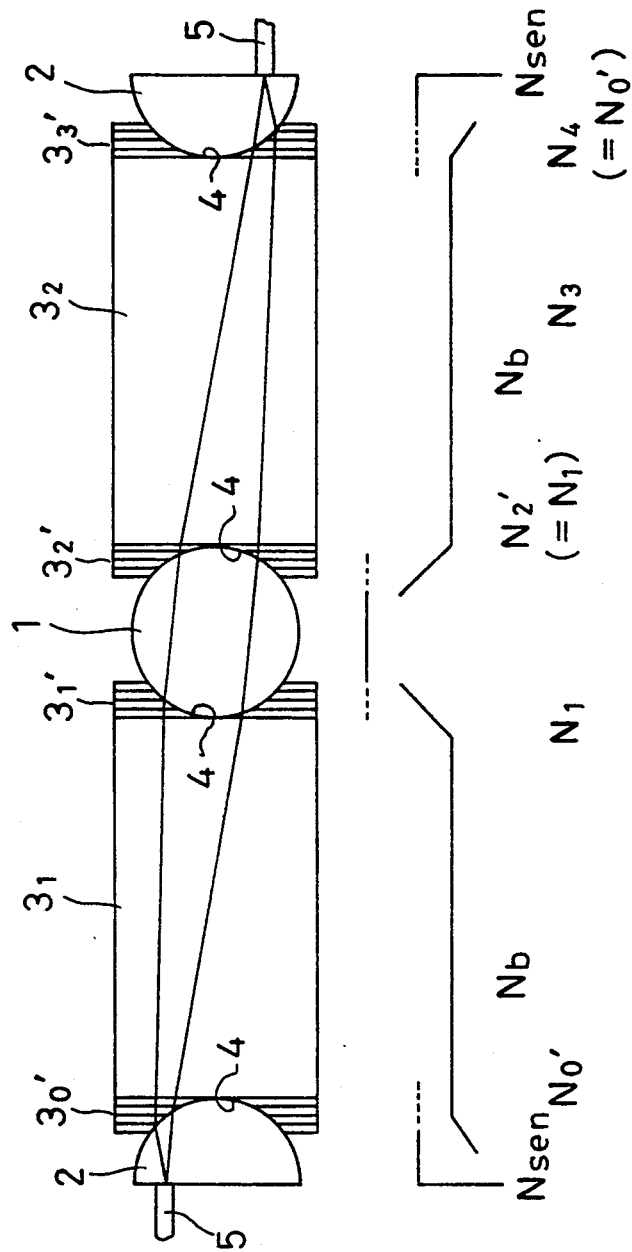
FIG. 12 is a diagram illustrating a basic configuration and a vicinity of an image forming plane of another embodiment of a compound lens of the present invention.

FIG. 12 is an axial cross-section and an index distribution graph of an essential portion of the second embodiment of the present invention. A heterogeneous portion $3_0'$ is similarly provided to the incident side of the first planar lens of FIG. 9 as the heterogeneous portion $3_1'$ of the outgoing side. A spherical recess 4 is formed in the heterogeneous portion $3_0'$, a homogeneous semi-sphere lens 2 is embedded in the spherical recess 4, and the centers of the incident homogeneous semi-sphere lens 2 and outgoing side homogeneous semi-sphere lens 2 are made conjugate points to each other. In place of the subscriptions (j=1, 2, 3) subscriptions (j=0, 1, 2, 3) are used. The compound lens is a 1:1 optical system, and is symmetric about the center of the homogeneous sphere lens 1. The homogeneous sphere lens 1 and the heterogeneous portions $3_1'$ and $3_2'$ of the planar lenses of j=1, 2 correct spherical aberration whereas two homogeneous semi-sphere lenses 2 and the heterogeneous portions $3_0'$ and $3_3'$ correct the remaining curvature of field. Since the lens are a 1:1 optical system, coma and distortion are not produced if curvature of field is corrected. The index distribution of each of the heterogeneous portions $3_1'$ and $3_2'$ of the planar lenses is given by substituting $L_1 = -L_2' = -2f$ to each of equations (13),

(14) and (15) and arranging them, and thereby the following equations (18), (19) and (20) are provided:

$$\sigma_{f1} = \sigma_{f2} = \sigma_f = 0.5 S_A / Q^4 \quad (18)$$

$$S_A = (1 - 1/n_{sb})/n_{sb} \quad (19)$$

$$N_{sb} = N_s / N_b \quad (20a)$$

$$f = 0.5 R n_{sb} / (n_{sb} - 1) \quad (20b)$$

$$Q = 1/n_{sb} \quad (20c)$$

By substituting equations (19), (20a), (20b), and (20c) to equation (18) the following equation (21) is obtained:

$$\sigma_f = 0.5 n_{sb}^2 (n_{sb} - 1) \quad (21)$$

In the embodiment of FIG. 12, the first and second planar lenses $3_1$ and $3_2$ having an index distribution are provided in respective opposite end walls with a pair of spherical recesses 4 and 4, a homogeneous sphere lens 1 is sandwiched between oppositely facing spherical recesses 4 and 4, a homogeneous semi-sphere lens 2 is embedded in a corresponding spherical recess 4 remote from the homogeneous sphere lens 1, and the centers of the homogeneous semi-sphere lenses 2 and 2 are made conjugate points to each other. The refractive index of the heterogeneous portions $3_0'$, $3_1'$, $3_2'$ and $3_3'$ of the planar lenses increases toward the homogeneous sphere lens 1 and decreases toward the corresponding homogeneous semi-sphere lenses 2 and 2. In this fashion, spherical aberration and curvature of field are corrected. The lens is a 1:1 optical system, distortion is automatically corrected if curvature of field is corrected. To facilitate connection of optical fibers 5 and 5, the refractive index of the incident side homogeneous semi-sphere lens 2 and the outgoing side homogeneous semi-sphere lens 2 is set higher than that of the homogeneous portions of the planar lenses, and lower than the homogeneous sphere lens 1, and the principal rays of off-axis incident and outgoing light are made parallel with the optical axis. The condition to provide such a structure is that the homogeneous sphere lens 1 and the homogeneous semi-sphere lenses 2 and 2 are equal in angle change of surface refraction, and therefore equation (22) is approximately established taking into consideration that the refractive index of the heterogeneous portions increases on the side of the homogeneous sphere lens 1 and decreases on the side of the homogeneous semi-sphere lenses 2 and 2. When $\sigma_{sem} = \sigma_{f3} + \sigma_{f0}$, the following equation is provided:

$$N_b \{1 + \sigma_f (y/R)^2\} / N_s = N_b \{1 + \sigma\, sem(y/R)^2\} / N_{sem} \quad (22)$$

The equation (22) may be modified as equation (23)

$$N_{sem} = N_s \{1 - (\sigma_f - \sigma\, sem)(y/R)^2\} \quad (23)$$

When equation (23) is satisfied in the vicinity of the periphery ($y/R = 0.7$) although not any level of the height y, then $N_{sem}/N_s = 0.9$.

Figure 13:
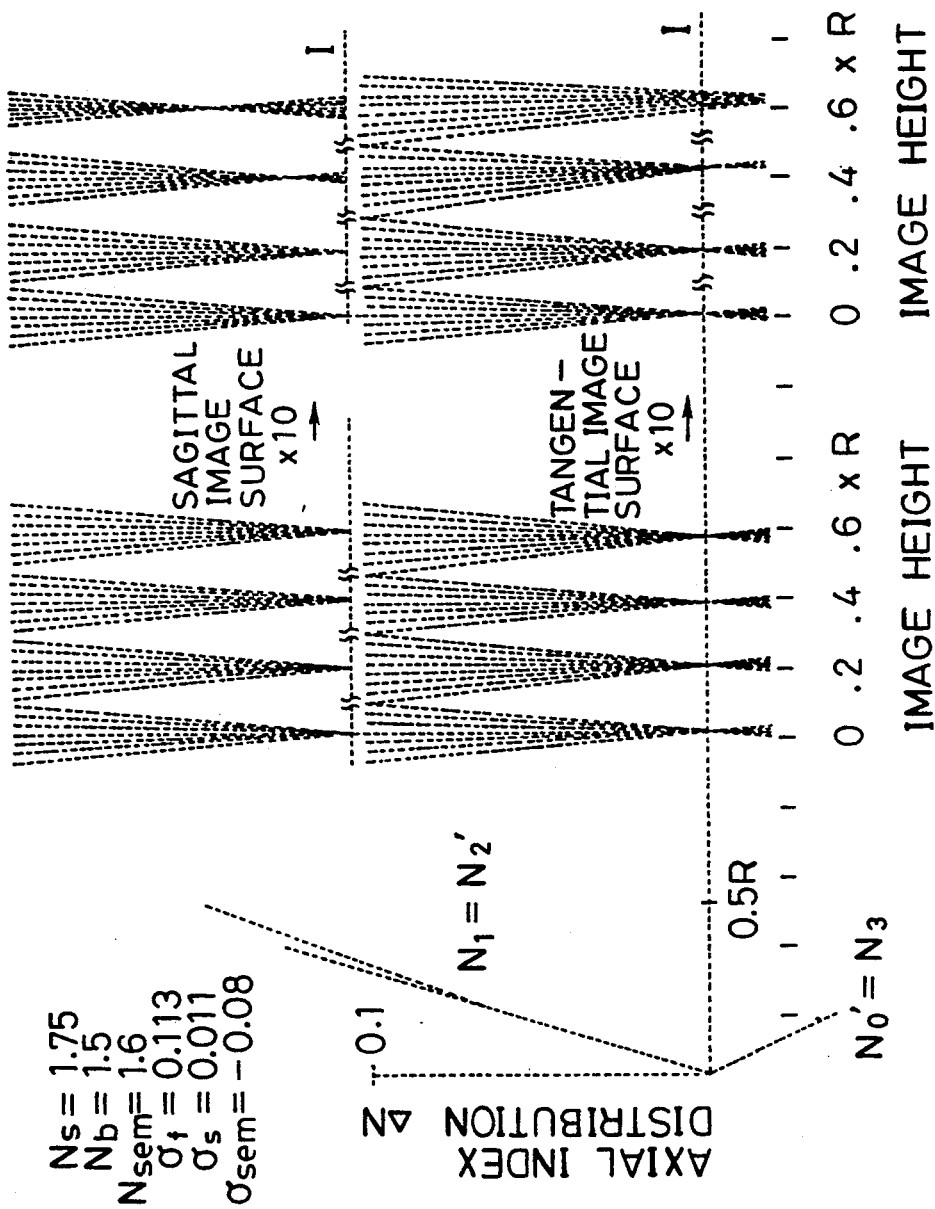
FIG. 13 is a diagram illustrating rays in the vicinity of an image forming plane of an object point row of which object points becomes equi-spaced when: in the lens in FIG. 12, the distribution of the sphere lens side heterogeneous portions thereof are determined by the graph of FIG. 10; the semi-sphere lens side heterogeneous portion have a distribution reverse to the distribution of the sphere lens side heterogeneous portions; and the refractive index of the semi-sphere lens is selected so that the principal rays of input light and output light become parallel with the optical axis.

FIG. 13 illustrates a result of ray tracing to an object point array placed on one end wall of one planar lens in the vicinity of the image plane. The upper and lower portions of FIG. 13 illustrate the curvature of sagital image surface and the tangential image surface, and the right view of each of the upper and lower portions has a magnification of 10 with the image points are drawn closer to each other. From FIG. 13, it is understood that about 150/R of resolution can be expected at an image height of 0.6 R. If 60% of radius of a lens having a radius R=2.5 mm is used, 30 single mode optical fibers having a radius 100 micrometers and a core radius of 10 micrometer may be arranged and used with a low loss.

Figure 14:
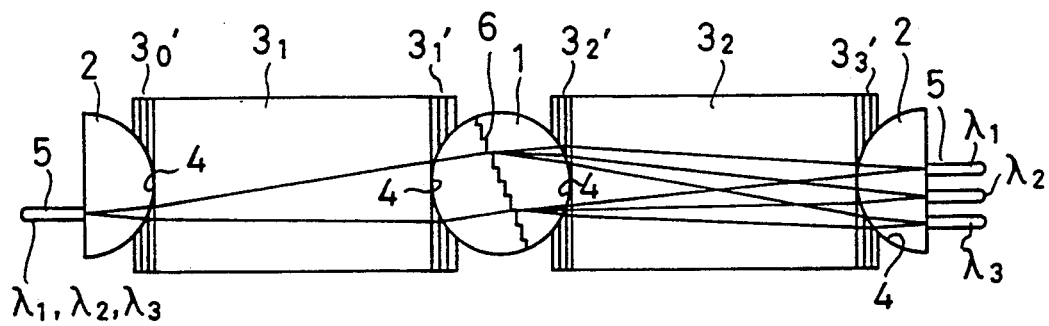
FIG. 14 is a diagram showing a compound lens of the present invention in which the sphere lens in the lenses shown in FIG. 12 is divided into two, between which a diffraction grating is formed, the compound lens serving as a wavelength demultiplexer.

In FIG. 14, the homogeneous sphere lens 1 is divided into halves, between which a transmission type diffraction grating 6 is formed. The homogeneous sphere lens 1 serves as a wavelength demultiplexer. A wavelength multiplex light which has been injected through an optical fiber 5 is filtered at the diffraction grating 6 and is taken out from optical fibers 5 and 5.

Figure 15:
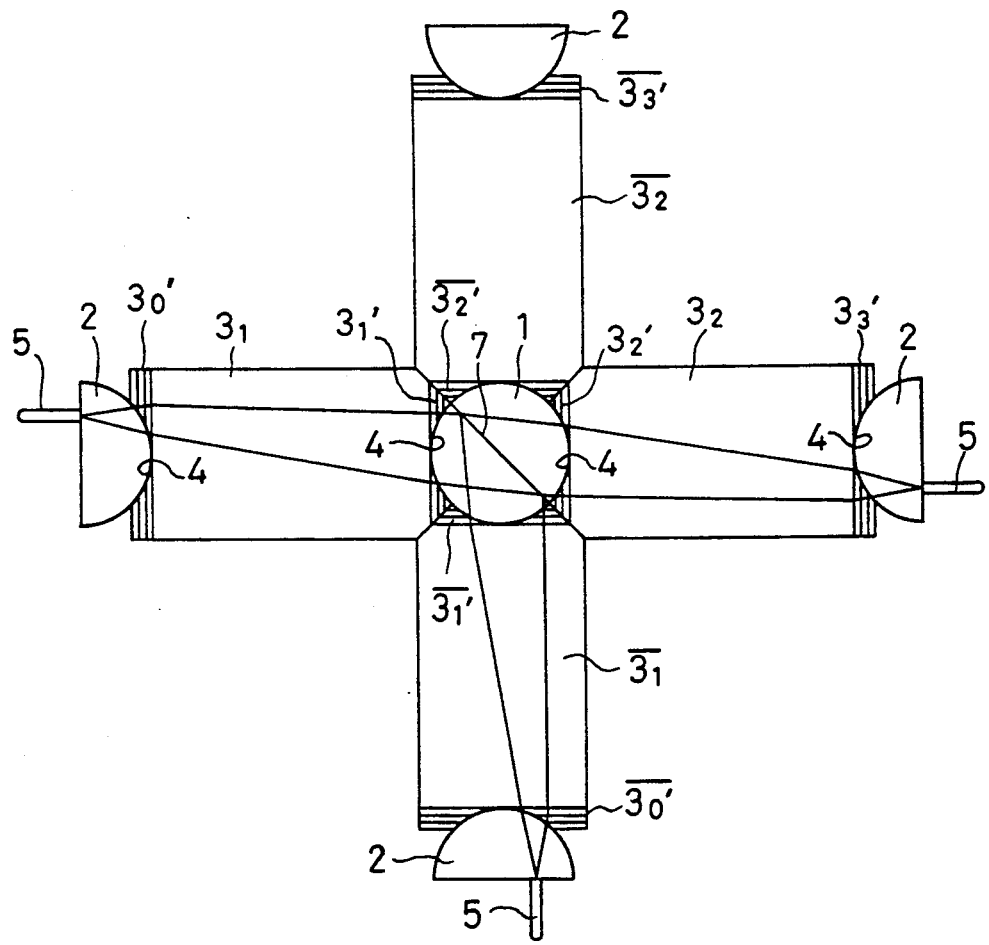
FIG. 15 is a configuration diagram showing a Michelson-Morley interferometer type compound lens of the present invention in which: a sphere lens is divided into halves; between the halves a semi-transparent film is applied; the plane of the semi-transparent film is inclined at 45° in the optical axis; and lenses are mounted also in a direction perpendicular to the optical axis.

FIG. 15 shows a configuration of a Michelson-Morley interferometer type lens in which: a homogeneous sphere lens 1 is divided into halves; between the halves a semi-transparent film is applied; the plane of the semi-transparent film is inclined at 45° toward the optical axis; and lenses consisting of homogeneous semi-sphere lenses 2, and 2, third and the fourth planar lenses $\overline{3_1}$ and $\overline{3_2}$, heterogeneous portions of planar lenses $\overline{3_0'}$, $\overline{3_1'}$, $\overline{3_2'}$ and $\overline{3_3'}$ are mounted also in a direction perpendicular to the optical axis. This compound lens is capable of dividing a light beam from an optical fiber 5 into two beams in two directions, and returning them for joining and interfering through an optical path. This compound lens is therefore suitable for measuring. Although only single optical fiber 5 is shown, an optical fiber bundle may be used for providing a multipath.

Figure 16:
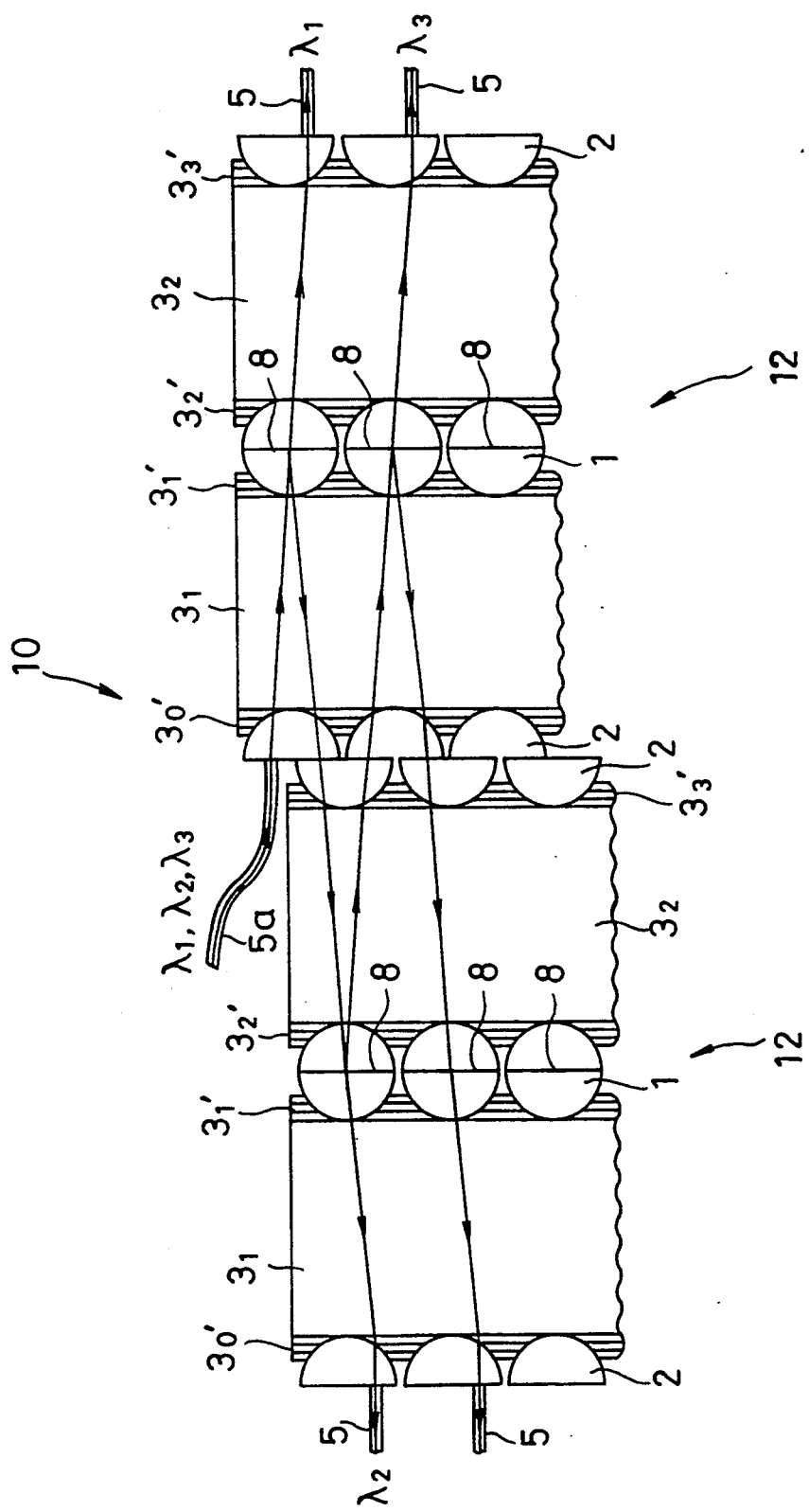
FIG. 16 is an axis cross-section showing a compound lens unit which may be used as demultiplexer and multiplexer: sphere lenses are each divided into halves, between which halves a multi-coating filter is attached; these sphere lenses are arranged in parallel to form a compound lens composite; and corresponding oppositely facing semi-sphere lenses of a pair of the compound lens composites are shifted by a half of the parallel pitch length of the semi-sphere lenses.

In a composite lens unit 10 of FIG. 16, three sphere lenses 1, 1, and 1 are each divided into halves, between which halves a multi-coating filter 8 is attached. These sphere lenses 1, 1, and 1 are held between planar lenses $3_1$ and $3_2$ and are arranged in parallel to form a compound lens composite 12. The corresponding oppositely facing semi-sphere lenses $3_0'$ and $3_3'$ of a pair of compound lens composites 12 and 12 are shifted by a half of the pitch length or the radius of the semi-sphere lenses $3_0'$ and $3_3'$ to form an exposed planar wall portion $2a$ for injecting wavelength division multiplex light into the compound lens unit 10 through an optical fiber $5a$. With such a construction, the injected wavelength division multiplex light is reflected or allowed to pass the multilayer filter 8 in the sphere lenses 1, 1, ..., and reflected components are slantingly reflected toward an adjacent semi-sphere lens 2 whereas passed components are sent to another semi-sphere lens 2 for taking out through a optical fiber 5 attached to the flat surface of that semi-sphere lens 2, whereby this composite lens may be used as demultiplexer. If this composite lens unit 10 is reversely used, it may be used as multiplexer. Although only single optical fiber 5 is shown, an optical fiber bundle may be used for multiplexing.

Embodiment 3

Figure 17:
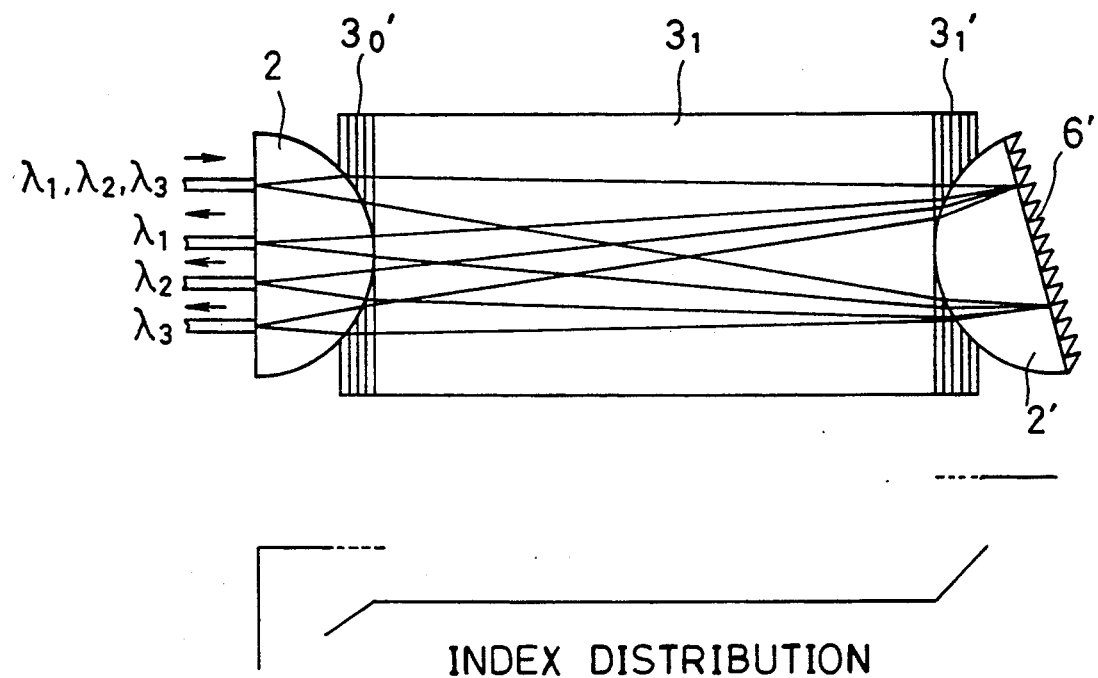
FIG. 17 is a diagrammatic illustration showing a demultiplexer which is a still another embodiment of the compound lens of the present invention.

FIG. 17 illustrates the third embodiment of the present invention, and this compound lens has a reflective diffraction grating 6' provided on the divided surface of a half of the sphere lens in place of the transmission type diffraction grating 6, and the overall length and the number of the components are reduced to a half. This compound lens serves as a reflective multiplexer and demultiplexer.

As previously described, the compound lenses of the present invention are capable of correcting not only spherical aberration and coma but also both curvature of field and distortion, and therefore remarkable enhancement in resolution is achieved. To correct curvature of field, an index distribution which is opposite in index gradient to the index distribution to correct spherical aberration is introduced, and homogeneous semi-sphere lenses which does not give any influence on spherical aberration are mounted to at least one planar lens. Moreover, the control of distortion is conducted by selecting the refractive index of the homogeneous semi-sphere lenses. With such a construction, the present invention may be applied to Fourier transform lenses, camera lenses, and $f\theta$ lenses, and it is therefore expected that the present invention provides a significant influence on compound lens design methods.

When optical computers are placed into practical use in the future, high resolution, compact lenses with ease of fabrication according to the present invention would become necessary since several mm diameter lenses are used instead of 20 mm diameter lenses which are used in optical laboratories at present.

Moreover, the present invention is fairly advantageous from a point of mass production: the homogeneous sphere lens, homogeneous semi-sphere lenses, and the first and the second planar lenses which have an index distribution are used as main members; end walls of the planar lenses are provided with an index distribution according to ion exchange; a spherical recess is formed in each of the end walls; a homogeneous sphere lens and homogeneous semi-sphere lenses are held between the spherical recesses. Therefore, the compound lens of the present invention may have a parallel structure in which sphere lenses and semi-sphere lenses are arranged in parallel to form a compound lens unit, or the present invention may be used as a compound lens composite.

The optical fiber coupling lens of the second embodiment is capable of not only correcting both spherical aberration and curvature of field but also arranging even off-axis optical fibers in parallel with the optical axis of the lens. Therefore, a large number of optical fibers may be arranged in parallel with the optical axis when the optical fibers are to be arranged. It is easy to construct a multiplexer-demultiplexer of the wavelength multiplex optical communication, for example. The optical fiber coupling lens may couple even optical fiber bundles. It is possible that the lens of the present invention may not allow any air layer to exist between optical fibers, and the lens is advantageous in that surfaces of the lens does not cloud even if it is placed in the sea and in the space for a long period of time.

What is claimed is:

1. A compound lens having an optical axis and a focus on the optical axis, comprising:
    a first planar lens having: a heterogeneous portion on one end portion thereof in which a refractive index is distributed along the optical axis; a homogeneous portion occupying another portion thereof; and a spherical recess formed in the heterogeneous portion;
    a second planar lens having first and second heterogeneous portions, each of which is formed on one end portion and another end portion thereof, and in each of the heterogeneous portions, a refractive index is distributed along the optical axis; a homogeneous portion occupying the another portion thereof; and first and second spherical recesses, each of which is formed respectively in the first and second heterogeneous portions;
    a sphere lens held between the one end portion of the first planar lens and the one end portion of the second planar lens to contact the spherical recess of the first planar lens and the first spherical recess of the second planar lens; and
    a semi-sphere lens held into the second spherical recess of the second planar lens, wherein:
        the center of curvature of the semi-sphere lens is placed at the focus on the optical axis,
        each of the sphere lens, the homogeneous portions of the planar lenses, and the semi-sphere lens is formed so that the refractive index thereof decreases in the described order,
        the heterogeneous portion of the first planar lens and the first heterogeneous portion of the second planar lens increase in refractive index toward the sphere lens so that the sphere lens is corrected in spherical aberration, and the heterogeneous portion of the first planar lens and the first heterogeneous portion of the second planar lens are formed so that a distribution gradient of the refractive index thereof are selected for correcting the sphere lens in coma,
        the second heterogeneous portion of the second planar lens decreases in refractive index toward the semi-sphere lens for correcting the compound lens in curvature of field, and
        the semi-sphere lens is smaller in refractive index than the homogeneous portion of each of the planar lenses for correcting the semi-sphere lens in distortion.

2. A compound lens as claimed in claim 1, wherein: the refractive index of the semi-sphere lens is selected in a range smaller than the refractive index of each of the first and second planar lenses; and when parallel incident rays are irradiated at an angle of $\omega$ with the optical axis to form an image, the image is in proportion in height with $\sin\omega$, whereby the compound lens may be used as a Fourier transform lens.

3. A compound lens as claimed in claim 1, wherein: the refractive index of the sphere lens is selected in a range smaller than the refractive index of the first and second planar lenses; and when parallel incident rays are irradiated at an angle of $\omega$ with the optical axis to form an image, the image is in proportion in height with $\omega$, whereby the compound lens may be used as a $f\omega$ lens.

4. A compound lens as claimed in claim 1, wherein: a ratio between the dispersion coefficients ($\delta N_b/\delta\nu$) of the homogeneous portions of the planar lenses and the dispersion coefficients ($\delta N_b/\delta\nu$) of the sphere lens is selected in the neighborhood of an equation (1) below; dispersion $\delta\sigma/\delta\nu$ of distribution coefficient $\sigma$ of the heterogeneous portion of the planar lenses is selected small; and when parallel incident rays are irradiated at an angle of $\omega$ with the optical axis to form an image, the image is in proportion in height with $\tan\omega$, whereby the compound lens may be used as a camera lens:

$$(\delta N_s)/N_s = (\delta N_b)/N_b \tag{1}$$

where $N_b$ indicates a refractive index of the homogeneous portion of the planar lenses, $N_s$ is a refractive index of the sphere lens, and $\nu$ is a frequency of light.

5. A compound lens having an optical axis and a focus on the optical axis, comprising:
    a first planar lens having: first and second heterogeneous portions on one and another end portions thereof, in each of the first and second heterogeneous portions, a refractive index is distributed along the optical axis; and first and second spherical recesses each formed in the first and second heterogeneous portions thereof, respectively;

a second planar lens having: first and second heterogeneous portions on one and another end portions thereof, in each of the heterogeneous portions, a refractive index is distributed along the optical axis; and first and second spherical recesses each formed respectively in the first and second heterogeneous portions thereof;

a sphere lens held between the another end portion of the first planar lens and the one end portion of the second planar lens to contact the second spherical recess of the first planar lens and the first spherical recess of the second planar lens;

a first semi-sphere lens held into the first spherical recess of the first planar lens; and a second semi-sphere lens held into the second spherical recess of the second planar lens, wherein:

the center of curvature of the each of the first and second semi-sphere lenses is placed at one of conjugate points, the conjugate points being in the relationship of an object point and an image point to each other, the second heterogeneous portion of the first planar lens and the first heterogeneous portion of the second planar lens increase in refractive index toward the sphere lens so that the sphere lens is corrected in spherical aberration, the second heterogeneous portion of the first planar lens and the first heterogeneous portion of the second planar lens decrease in refractive index toward each of the semi-sphere lenses for correcting the compound lens in curvature of field, and each of the sphere lens, the semi-sphere lenses, and the homogeneous portions of the planar lenses is formed so as to decrease the refractive index thereof in the described order so that a principal ray between an object point, away from the optical axis, and the inverted image thereof becomes substantially parallel with the optical axis, whereby the compound lens may be used for interconnecting optical fibers.

6. A compound lens as claimed in claim 5, wherein:
the sphere lens comprises sphere lens halves and one element attached between the sphere lens halves, the one element being one of a reflecting mirror, a half mirror, a multi-layer filter, and a diffraction grating; and the optical axes of the first and second planar lenses have the same direction or perpendicularly intersect at the sphere lens, whereby the compound lens may be used for dividing, joining, separating or superposing light beams of optical fibers.

7. A compound lens unit using two compound lenses as claimed in claim 5, wherein:

the compound lenses are connected in series with corresponding semi-sphere lenses oppositely facing to each other;

the sphere lens of each compound lens comprises: sphere lens halves, each of the sphere lens half having a planar wall oppositely facing to a planar wall of the other sphere lens half; and a multi-layer filter attached on the oppositely facing planar walls of the sphere lens halves, and wherein:

the oppositely facing semi-sphere lenses are jointed with a shift of the radius thereof to form an exposed planar wall portion for injecting wavelength division multiplex light into the compound lens unit, whereby the injected wavelength division multiplex light is reflected or allowed to pass the multi-layer filter in the sphere lenses, and reflected components are slantingly reflected toward an adjacent semi-sphere lens whereas passed components are sent to another semi-sphere lens for taking out through a glass fiber.

8. A compound lens unit using two compound lens composites each including parallel compound lenses as claimed in claim 5, wherein:

the compound lens composite are connected in series with corresponding semi-sphere lenses oppositely facing to each other;

the sphere lens of each compound lens comprises: sphere lens halves, each of the sphere lens half having a planar wall oppositely facing to a planar wall of the other sphere lens half; and a multi-layer filter attached on the oppositely facing planar walls of the sphere lens halves, and wherein:

the oppositely facing semi-sphere lenses are jointed with a shift of the radius thereof to form an exposed planar wall portion for injecting wavelength division multiplex light into the compound lens unit, whereby the injected wavelength division multiplex light is reflected or allowed to pass the multi-layer filter in the sphere lenses, and reflected components are slantingly reflected toward an adjacent semi-sphere lens whereas passed components are sent to another semi-sphere lens for taking out through a glass fiber.

9. A compound lens having an optical axis and a focus on the optical axis, comprising:

a planar lens having a heterogeneous portion on both end portions thereof in which refractive index is distributed along the optical axis, and a spherical recess formed respectively in each of the heterogeneous portions; and a pair of semi-sphere lenses each having a planar wall and being homogeneous in refractive index, and each semi-sphere lens being fitted into the spherical recess, one of the semi-sphere lenses having one of a reflecting mirror and a reflective diffraction grating formed on the planar wall thereof.

* * * * *